B. A. Goodell,
Rotary Steam Engine.
Nº 29,584. Patented Aug. 14, 1860.
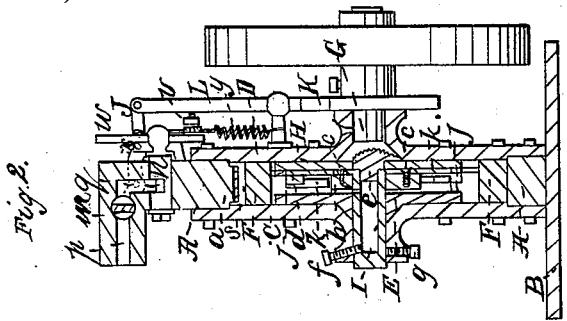
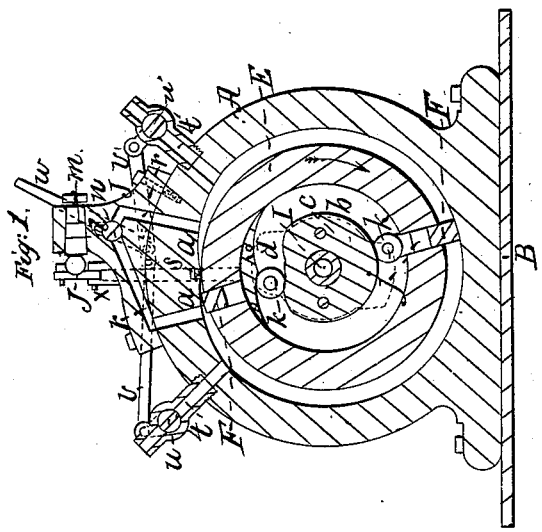
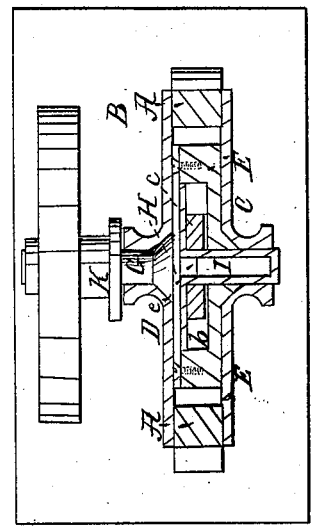
Witnesses:
Inventor:
B. A. Goodell
per [attorneys]

UNITED STATES PATENT OFFICE.

BARDWELL A. GOODELL, OF MILLBURY, MASSACHUSETTS.

ROTARY ENGINE.

Specification of Letters Patent No. 29,584, dated August 14, 1860.

*To all whom it may concern:*

Be it known that I, BARDWELL A. GOODELL, of Millbury, in the county of Worcester and State of Massachusetts, have invented a new and Improved Rotary Engine; and I do hereby declare that the following is a full, clear, and exact description of the same, reference being had to the accompanying drawing, forming part of this specification, in which—

Figures 1 and 2 are vertical sections at right angles to each other of a rotary engine to be used as a motor. Fig. 3 is a horizontal section through the axis.

Similar letters of reference indicate corresponding parts in all the figures.

A, is the peripheral portion of the cylinder having cast with it a foot or base through which to bolt it to the bed plate B, and having permanently attached to it the abutment $a$, which is fitted with packing $s$.

C, and D, are the heads of the cylinder made capable of removal.

E H, is the rotating piston wheel carrying the sliding pistons F F, upon which the steam acts to produce the rotary motion of the said wheel and of the main shaft G, to which it is secured.

$b\ c\ d$, is a fixed cam arranged within the piston wheel for the purpose of producing the necessary movements of the pistons toward and from the center of the cylinder to enable them to pass the abutments.

The rotating piston wheel is made of two pieces to provide for the inclosure within it of the cam $b\ c\ d$, and for the introduction of the pistons viz. a flat circular plate H, which is keyed or otherwise firmly secured on the shaft, and a circular plate E, of similar external diameter having a broad thick rim which is screwed to the said plate H, and forms a cylindrical cavity between the two plates. The shaft G, is made to fit a bearing in the cylinder head D, through which it passes, and outside of which it is furnished with a driving drum or other device for transmitting motion. The said shaft only extends inward beyond the plate H, in the form of a journal $e$, which fits to a cylindrical journal box I, which is secured in the head C, of the cylinder by two set screws $f$, and $g$. The exterior of this journal box fits snugly in an opening provided for it in the center of the plate E, through which it passes, and its outer end is closed; but there is formed in the said journal box for the introduction of oil for lubrication, an oil hole $h$, which is reached by taking out the set screw $f$. There is also another oil hole $i$, in the said box to admit oil therefrom to the cavity within the piston wheel for the lubrication of the pistons and cam.

The cam $b\ c\ d$, is made of three pieces, of which $b$, is a broad circular flange formed upon the journal box I, of a width to fit to the interior of the cavity of the wheel E H, and $c\ d$, are two plates bolted or otherwise permanently attached to the said flange, the plate $c$, having its profile of a form to correspond with the interior profile of the cylinder with which it is concentric, and the plate $d$, corresponding in form with the abutment $a$. The pistons F, F, are fitted to slide radially in the rim of their wheel E H, and their stems $j$, $j$, which enter the cavity of the wheel have attached to them rollers $k$, $k$, which will roll on the edge of the plate $c$, of the cam with the pistons in contact with the inner peripheral surface of the cylinder. Springs may be applied in connection with the rollers to keep the pistons always pressed out toward the inner peripheral surface of the cylinder.

On that part of the exterior of the cylinder which is opposite to the abutment there is secured a valve box J, in which there are two cock valves $m$, and $n$. The valve $m$, communicates with the induction pipe $p$, and is for the induction and cutting off of the steam. It also communicates by a passage $q$, with the valve $n$, which is for directing the steam from the said passage $q$, into one or the other of two passages $r$, $r'$, which lead into the cylinder on opposite sides of the middle of the abutment according to the direction in which the rotary motion of the shaft is desired. On opposite sides of the abutment there are two exhaust pipes $t$, and $t'$, provided with stop cocks or valves $u$, and $u'$, which are so connected by rods $v$, $v'$, with a lever $w$, on the head of the valve $n$, that when the valve is set to admit steam to the cylinder on one side of the abutment the valve $u$, or $u'$, on that side is closed and the opposite valve $u'$, or, $u$, opened. The connections of the rods $v$, $v'$, with the lever $w$, that the latter may be moved to close the valve $n$, to shut off steam and stop the engine and open it to the same side of the abutment as before without disturbing the exhaust valves $u$, $u'$. The valve $m$, is connected with a lever J, which works on a fixed fulcrum $x$, and which has attached to it a rod L, which is kept by a spring $y$, in contact with a cam K, on the main shaft G.

Fig. 1, of the drawing represents the induction passage $r'$, and the eduction pipe $t$, open and the induction passage $r$, and eduction pipe $t'$, closed and the piston wheel to be rotating in the direction of the arrow shown upon it. By shifting the lever $w$, the condition of the valves may be reversed and the piston wheel will be caused to rotate in the opposite direction. Whichever be the direction in which the piston wheel rotates, the pistons are drawn into the said wheel before their arrival at the abutment and forced out again after passing the abutment, by the action of the stationary cam on the rollers $k, k$, as the latter revolve around it, and the valve $n$, is closed by the action of the cam K, to cut off the steam while each piston passes the abutment and opened again by the spring $y$, to admit steam between the abutment and piston after the latter has completely passed the curve of the abutment. The cam K, may be so constructed as to cut off the steam at such point in the revolution of the pistons as may be desired to use the steam expansively.

By providing only a single induction port and a single eduction passage and dispensing with all the valves, and applying power to produce the revolution of the main shaft and piston wheel my improved engine may be made to serve as a pump.

What I claim as my invention and desire to secure by Letters Patent, is—

1. The arrangement in combination with the hollow piston wheel E H, and the pistons F F, of the cam $b\ c\ d$, attached to the journal box I, which receives the inner end of the shaft and inclosed within the piston wheel substantially as herein described.

2. The arrangement of the three valves $n$, $u$, $u'$, and their connections $w, v, v'$, in combination with the single induction passage $q$, and its two branches $r, r'$, and the two exhaust pipes or passages $t, t$, substantially as and for the purpose herein specified.

BARDWELL A. GOODELL.

Witnesses:
A. E. CUTTING,
F. K. HODGMAN.